United States Patent
Xiao et al.

(10) Patent No.: US 12,408,045 B2
(45) Date of Patent: Sep. 2, 2025

(54) SECONDARY CELL ACTIVATION METHOD AND APPARATUS

(71) Applicant: Huawei Technologies Co., Ltd., Shenzhen (CN)

(72) Inventors: Jiehua Xiao, Shenzhen (CN); Hao Tang, Ottawa (CA); Yi Wang, Shanghai (CN); Xiaona Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 611 days.

(21) Appl. No.: 17/541,935

(22) Filed: Dec. 3, 2021

(65) Prior Publication Data

US 2022/0095125 A1 Mar. 24, 2022

Related U.S. Application Data

(63) Continuation of application No. PCT/CN2020/094183, filed on Jun. 3, 2020.

(30) Foreign Application Priority Data

Jun. 6, 2019 (CN) .......................... 201910491326.1

(51) Int. Cl.
*H04W 16/28* (2009.01)
*H04L 5/00* (2006.01)
(Continued)

(52) U.S. Cl.
CPC ........... *H04W 16/28* (2013.01); *H04L 5/0051* (2013.01); *H04W 24/10* (2013.01); *H04W 56/001* (2013.01)

(58) Field of Classification Search
None
See application file for complete search history.

(56) References Cited

U.S. PATENT DOCUMENTS 9,674,727 B2 6/2017 Damnjanovic et al.
10,455,635 B2 10/2019 Park et al.
(Continued)

FOREIGN PATENT DOCUMENTS

CN 105917607 A 8/2016
CN 107211296 A 9/2017
(Continued)

OTHER PUBLICATIONS

"Discussion on beam information indication for CA and DC," Agenda item: 7.3.4.2, Source: MTI, APT, Document for: Discussion, 3GPP TSG RAN WG1 Meeting 91, R1-1720562, Reno, USA, Nov. 27-Dec. 1, 2017, 6 pages.
(Continued)

*Primary Examiner* — Scott M Sciacca
(74) *Attorney, Agent, or Firm* — SLATER MATSIL, LLP

(57) ABSTRACT

A secondary cell activation method and an apparatus, the method including sending, by a terminal device, first indication information to a network device, where the first indication information indicates receive beam direction information of the terminal device, and where the receive beam direction information is associated with a channel state information reference signal (CSI-RS) resource for activating a secondary cell of the terminal device, receiving, by the terminal device, configuration information from the network device, where the configuration information configures the CSI-RS resource, and sending, by the terminal device, a first channel state information (CSI) report to the network device, where the first CSI report is obtained based on the CSI-RS resource, and where the first CSI report is used to activate the secondary cell.

17 Claims, 5 Drawing Sheets

(51) Int. Cl.
  *H04W 24/10* (2009.01)
  *H04W 56/00* (2009.01)

(56) References Cited

U.S. PATENT DOCUMENTS

| | | | |
|---|---|---|---|
| 10,892,868 B2 | 1/2021 | Yan et al. | |
| 2017/0085345 A1* | 3/2017 | Dinan | H04W 72/0453 |
| 2019/0014492 A1* | 1/2019 | Kim | H04W 76/27 |
| 2019/0090227 A1 | 3/2019 | Tsai et al. | |
| 2019/0150161 A1 | 5/2019 | Cheng et al. | |
| 2019/0215136 A1* | 7/2019 | Zhou | H04L 1/1819 |
| 2019/0261444 A1* | 8/2019 | Axmon | H04W 76/28 |
| 2020/0029316 A1* | 1/2020 | Zhou | H04W 52/0206 |
| 2020/0177336 A1 | 6/2020 | Li | |
| 2020/0351041 A1* | 11/2020 | Lin | H04L 5/0098 |
| 2022/0095127 A1* | 3/2022 | Tang | H04L 5/0098 |

FOREIGN PATENT DOCUMENTS

| | | |
|---|---|---|
| CN | 108282316 A | 7/2018 |
| CN | 109391986 A | 2/2019 |
| CN | 109788564 A | 5/2019 |
| CN | 109802776 A | 5/2019 |
| WO | 2019084570 A1 | 5/2019 |

OTHER PUBLICATIONS

"Low Latency of SCell Activation," Agenda Item: 7.2.13.4, Source: Huawei, HiSilicon, Document for: Discussion and Decision, 3GPP TSG RAN WG1 Meeting #96bis, R1-1903992, Xi'an, China, Apr. 8-12, 2019, 6 pages.

"3rd Generation Partnership Project; Technical Specification Group Radio Access Network; Evolved Universal Terrestrial Radio Access (E-UTRA); Physical layer procedures (Release 10)," 3GPP TS 36.213 V10.5.0, Mar. 2012, 125 pages.

"3rd Generation Partnership Project; Technical Specification Group Radio Access Network; Evolved Universal Terrestrial Radio Access (E-UTRA); Physical layer procedures (Release 15)," 3GPP TS 36.213 V15.0.0, Dec. 2017, 493 pages.

Qingzhe, R. et al., "Secondary Cells Activation and Deactivation During the Carrier Aggregation Process," Network and Communication, Nov. 13, 2015, 4 pages.

* cited by examiner

SECONDARY CELL ACTIVATION METHOD AND APPARATUS

CROSS-REFERENCE TO RELATED APPLICATIONS

This application is a continuation of International Application No. PCT/CN2020/094183, filed on Jun. 3, 2020, which claims priority to Chinese Patent Application No. 201910491326.1, filed on Jun. 6, 2019. The aforementioned applications are hereby incorporated by reference in their entireties.

TECHNICAL FIELD

This application relates to the communication field, and more specifically, to a secondary cell activation method and an apparatus.

BACKGROUND

To support a larger transmission bandwidth, two or more component carriers (CCs) (which may also be referred to as, component carriers, carriers, or the like) can be aggregated to serve one terminal device. The at least two CCs used for aggregation may be CCs on a same base station, or may be CCs on different base stations.

A cell may be a primary cell (PCell) or a secondary cell (SCell). The PCell is determined when connection establishment is performed between a terminal device and a network side, and is responsible for radio resource control (RRC) communication with the terminal device. The SCell is added/modified/released by using an RRC connection reconfiguration message after an initial security activation procedure, and is used to provide additional radio resources. A configured SCell other than the PCell cannot be used immediately after being configured. To better manage battery consumption of a terminal device configured with a plurality of cells, an SCell activation/deactivation mechanism is provided. Reporting a valid channel state information (CSI) report of an SCell by the terminal device to the network side indicates an end of an SCell activation process.

The SCell activation process is related to a frequency range of the SCell. However, the SCell activation mechanism in a current technology cannot be applied to all frequency ranges.

SUMMARY

This application provides a secondary cell activation method and an apparatus, to help resolve a problem of an SCell activation failure caused by misalignment of transmit and receive beams of a high frequency channel state information reference signal (CSI-RS).

According to a first aspect, a secondary cell activation method is provided. The method includes the following.

A terminal device sends first indication information to a network device, where the first indication information is used to indicate receive beam direction information of the terminal device, and the receive beam direction information is used to determine a channel state information reference signal (CSI-RS) resource for activating a secondary cell of the terminal device.

The terminal device receives configuration information sent by the network device, where the configuration information is used to configure the CSI-RS resource.

The terminal device sends a first CSI report to the network device, where the first CSI report is obtained based on the CSI-RS resource, and the first CSI report is used to activate the secondary cell.

In this embodiment of this application, in an SCell activation process, the terminal device reports the receive beam direction information to the network device, so that the network device may adjust a transmit beam direction of the CSI-RS resource based on the receive direction information. In this way, the transmit beam direction of the CSI-RS may be aligned with a receive beam direction of the terminal device, and the terminal device may receive the CSI-RS resource and perform CSI measurement to obtain valid CSI. Therefore, the SCell activation process is completed. In this embodiment of this application, because the CSI-RS resource can be configured based on the receive beam direction information, a problem of an SCell activation failure caused by misalignment of transmit and receive beams of a high frequency CSI-RS signal can be resolved.

With reference to the first aspect, in some implementations of the first aspect, the terminal device receives second indication information sent by the network device, where the second indication information is used to indicate a report quantity of a second CSI report, the second indication information includes an information element used to indicate the terminal device to report the receive beam direction information, and the second CSI report includes the receive beam direction information.

That the terminal device sends the first indication information to the network device includes the following.

The terminal device sends the second CSI report to the network device based on the second indication information.

In this way, the network device may indicate, by using the second indication information, the terminal device to perform beam sweeping in the SCell activation process, and to report the receive beam direction information by using the second CSI report.

With reference to the first aspect, in some implementations of the first aspect, the terminal device receives third indication information sent by the network device, where the third indication information is used to indicate a report quantity of a second CSI report, and the terminal device receives a secondary cell activation command sent by the network device.

That the terminal device sends the first indication information to the network device includes the terminal device sends the second CSI report to the network device based on the third indication information and the secondary cell activation command, where the second CSI report includes the receive beam direction information.

In this way, the network device may indicate, by using the third indication information and the secondary cell activation command, the terminal device to perform beam sweeping in the SCell activation process, and to report the receive beam direction information by using the second CSI report.

According to a second aspect, a secondary cell activation method is provided. The method includes a network device receives first indication information sent by a terminal device, where the first indication information is used to indicate receive beam direction information of the terminal device, and the receive beam direction information is used to determine a channel state information reference signal CSI-RS resource for activating a secondary cell of the terminal device.

The network device sends configuration information to the terminal device, where the configuration information is used to configure the CSI-RS resource.

The network device receives a first CSI report sent by the terminal device, where the first CSI report is obtained based on the CSI-RS resource, and the first CSI report is used to activate the secondary cell.

Therefore, in this embodiment of this application, in an SCell activation process, the terminal device reports the receive beam direction information to the network device, so that the network device may adjust a transmit beam direction of the CSI-RS resource based on the receive direction information. In this way, the transmit beam direction of the CSI-RS may be aligned with a receive beam direction of the terminal device, and the terminal device may receive the CSI-RS resource and perform CSI measurement to obtain valid CSI information. Therefore, the SCell activation process is completed. In this embodiment of this application, because the CSI-RS resource can be configured based on the receive beam direction information, a problem of an SCell activation failure caused by misalignment of transmit and receive beams of a high frequency CSI-RS signal can be resolved.

With reference to the second aspect, in some implementations of the second aspect, the network device sends second indication information to the terminal device, where the second indication information is used to indicate a report quantity of a second CSI report, the second indication information includes an information element used to indicate the terminal device to report the receive beam direction information, and the second CSI report includes the receive beam direction information.

That the network device receives the first indication information sent by the terminal device includes the network device receives the second CSI report sent by the terminal device.

In this way, the network device may indicate, by using the second indication information, the terminal device to perform beam sweeping in the SCell activation process, and to report the receive beam direction information by using the second CSI report.

With reference to the second aspect, in some implementations of the second aspect, the network device sends third indication information to the terminal device, where the third indication information is used to indicate a report quantity of a second CSI report, and the network device sends a secondary cell activation command to the terminal device.

That the network device receives the first indication information sent by the terminal device includes the following.

The network device receives the second CSI report sent by the terminal device, where the second CSI report includes the receive beam direction information.

In this way, the network device may indicate, by using the third indication information and the secondary cell activation command, the terminal device to perform beam sweeping in the SCell activation process, and to report the receive beam direction information by using the second CSI report.

With reference to the first aspect or the second aspect, in some implementations of the first aspect or the second aspect, the receive beam direction information includes a synchronization signal block (SSB) resource indication or a CSI-RS resource indication. The SSB resource indication may include an SSB resource indicator (SSBRI), an SRS resource index (SRI), and the like. The CSI-RS resource indication may include a CSI-RS resource indicator (CRI).

With reference to the first aspect or the second aspect, in some implementations of the first aspect or the second aspect, the first indication information includes a valid indication, and the valid indication is used to indicate that the receive beam direction information is valid. When the receive beam direction information is valid, the network device may configure the CSI-RS resource based on the receive beam direction information.

Optionally, in some possible embodiments, the valid indication may alternatively be used to indicate that the receive beam direction information is invalid. When the receive beam direction information is invalid, the receive beam direction information may be an intermediate beam sweeping result or an invalid measurement result. Correspondingly, the network device may ignore the invalid receive beam direction information.

Optionally, the network device may further configure, for the terminal device, a reference signal resource used for beam sweeping. In some possible implementations, the reference signal resource used for beam sweeping may be a periodic resource, or may be an aperiodic resource or a semi-persistent resource.

Optionally, the network device may further configure, for the terminal device, a resource for reporting a CSI report (which may be referred to as a CSI reporting resource) by the terminal device. In some possible implementations, the CSI reporting resource may be a periodic resource, or may be an aperiodic resource or a semi-persistent resource.

It should be noted that, because a time point at which the terminal device starts to perform CSI measurement and a time point at which the terminal device obtains a beam measurement sweeping result are not easy to predict, the periodic reference signal resource and the periodic CSI report may be preferentially selected. However, the embodiments of this application are not limited thereto.

With reference to the first aspect or the second aspect, in some implementations of the first aspect or the second aspect, the first CSI report is reported within an activation delay of the secondary cell, and the activation delay includes time for performing beam sweeping by the terminal device.

In the embodiments of this application, in the SCell activation process, because a beam sweeping process is added, corresponding time for obtaining a valid CSI report by the terminal device increases. Therefore, the activation delay corresponding to the secondary cell includes the time for performing beam sweeping by the terminal device.

According to a third aspect, a wireless communication apparatus is provided. The apparatus may be a terminal device, or may be a chip that may be used in the terminal device. The apparatus has a function of implementing the terminal device in the first aspect and the possible implementations. The function may be implemented by hardware, or may be implemented by hardware by executing corresponding software. The hardware or the software includes one or more modules corresponding to the foregoing function.

In a possible design, the apparatus includes a transceiver module. Optionally, the apparatus further includes a processing module. The transceiver module may be, for example, at least one of a transceiver, a receiver, and a transmitter. Optionally, the transceiver module may include a radio frequency circuit or an antenna. The processing module may be a processor. Optionally, the apparatus further includes a storage module, and the storage module may be, for example, a memory. When the storage module is included, the storage module is configured to store instructions or data. In a possible manner, the processing module is connected to the storage module. The processing module may execute the instructions stored in the storage module or instructions from another module, so that the apparatus performs the communication method according to the first aspect and the possible implementations.

In another possible design, when the apparatus is the chip, the chip includes a transceiver module. Optionally, the apparatus further includes a processing module. The transceiver module may be, for example, an input/output interface, a pin, or a circuit on the chip. The processing module may be, for example, a processor. Optionally, the processing module enables the chip to implement the method according to any one of the first aspect and the possible implementations. Optionally, the processing module may execute instructions in a storage module or invoke information such as data in the storage module. The storage module may be a storage module inside the chip, for example, a register or a cache. The storage module may alternatively be located inside a communication device but outside the chip, for example, a read-only memory (ROM) or another type of static storage device that can store static information and instructions, or a random access memory (RAM).

The processor mentioned in any of the foregoing designs may be a general-purpose central processing unit (CPU), a microprocessor, an application-specific integrated circuit (ASIC), or one or more integrated circuits configured to control program execution of the first aspect and the possible implementations.

According to a fourth aspect, a wireless communication apparatus is provided. The apparatus may be a network device, or may be a chip that may be used in the network device. The apparatus has a function of implementing the network device according to any one of the second aspect and the possible implementations of the second aspect. The function may be implemented by hardware, or may be implemented by hardware by executing corresponding software. The hardware or the software includes one or more modules corresponding to the foregoing function.

In a possible design, the apparatus includes a transceiver module. Optionally, the apparatus further includes a processing module. The transceiver module may be, for example, at least one of a transceiver, a receiver, and a transmitter. Optionally, the transceiver module may include a radio frequency circuit or an antenna. The processing module may be a processor. Optionally, the apparatus further includes a storage module, and the storage module may be, for example, a memory. When the storage module is included, the storage module is configured to store instructions or data. In a possible manner, the processing module is connected to the storage module. The processing module may execute the instructions stored in the storage module or instructions from another module, so that the apparatus performs the method according to any one of the second aspect and the possible implementations of the second aspect.

In another possible design, when the apparatus is the chip, the chip includes a transceiver module. Optionally, the chip further includes a processing module. The transceiver module may be, for example, an input/output interface, a pin, or a circuit on the chip. The processing module may be, for example, a processor. Optionally, the processing module enables the chip to implement the communication method according to any one of the second aspect and the possible implementations of the second aspect. Optionally, the processing module may execute instructions in a storage module or invoke information such as data in the storage module. The storage module may be a storage module inside the chip, for example, a register or a cache. The storage module may alternatively be located inside a communication device but outside the chip, for example, a read-only memory (ROM) or another type of static storage device that can store static information and instructions, or a random access memory (RAM).

The processor mentioned in any of the foregoing designs may be a general-purpose central processing unit (CPU), a microprocessor, an application-specific integrated circuit (ASIC), or one or more integrated circuits configured to control program execution of the method according to any one of the second aspect and the possible implementations of the second aspect.

According to a fifth aspect, a computer storage medium is provided. The computer storage medium stores program code. The program code is used to indicate to execute instructions of the method according to any one of the first aspect or the second aspect and the possible implementations of the first aspect or the second aspect.

According to a sixth aspect, a computer program product including instructions is provided. When the computer program product runs on a computer, the computer is enabled to perform the method according to any one of the first aspect or the second aspect and the possible implementations of the first aspect or the second aspect.

According to a seventh aspect, a communication system is provided. The communication system includes an apparatus that has a function of implementing the method and the possible designs according to the first aspect and an apparatus that has a function of implementing the method and the possible designs according to the second aspect.

According to an eighth aspect, a processor is provided. The processor is coupled to a memory, and is configured to perform the method according to any one of the first aspect or the second aspect and the possible implementations of the first aspect or the second aspect.

According to a ninth aspect, a chip is provided. The chip includes a processor and an interface circuit. The interface circuit is configured to receive a signal from a communication apparatus other than the communication apparatus and transmit the signal to the processor, or send a signal from the processor to a communication apparatus other than the communication apparatus. The processor is configured to implement, through a logic circuit or by executing code instructions, the method according to any one of the first aspect or the second aspect and the possible implementations of the first aspect or the second aspect.

Optionally, the chip may further include a memory. The memory stores instructions. The processor is configured to execute the instructions stored in the memory or instructions from another module. When the instructions are executed, the processor is configured to implement the method according to any one of the first aspect or the second aspect and the possible implementations of the first aspect or the second aspect.

Optionally, the chip may be integrated into a terminal device or a network device.

DETAILED DESCRIPTION OF ILLUSTRATIVE EMBODIMENTS

The following describes technical solutions of this application with reference to the accompanying drawings.

The technical solutions of embodiments of this application may be used in various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system, or a new radio (NR) system.

For ease of understanding the embodiments of this application, communication systems to which the embodiments of this application are applicable are described in detail with reference to FIG. 1 and FIG. 2.

Figure 1:
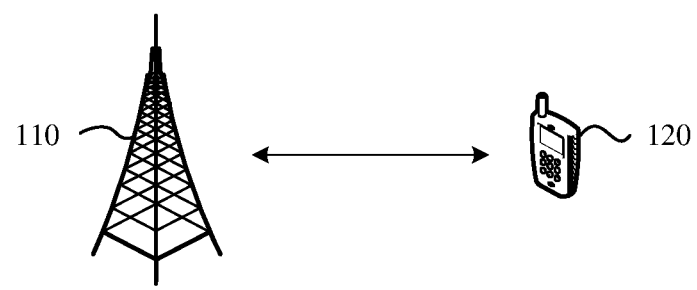
FIG. 1 is a schematic diagram of a communication system to which an embodiment of this application is applicable.

FIG. 1 is a schematic diagram of a communication system too to which a cell activation method and an apparatus in an embodiment of this application are applicable. As shown in FIG. 1, the communication system too may include a network device, for example, a network device 110 shown in FIG. 1, the communication system too may further include at least one terminal device, for example, a terminal device 120 shown in FIG. 1. The network device 110 may communicate with the terminal device 120 through a radio link.

Figure 2:
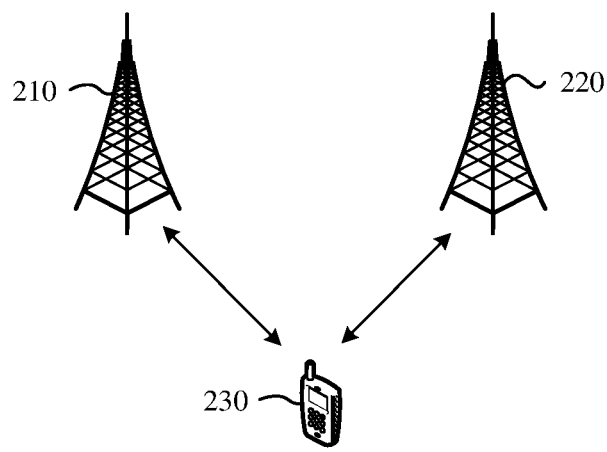
FIG. 2 is another schematic diagram of a communication system to which an embodiment of this application is applicable.

FIG. 2 is another schematic diagram of a communication system 200 to which a signal sending and receiving method and an apparatus in an embodiment of this application are applicable. As shown in the figure, the communication system 200 may include at least two network devices, for example, network devices 210 and 220 shown in FIG. 2, the communication system 200 may further include at least one terminal device, for example, a terminal device 230 shown in FIG. 2. The terminal device 230 may establish radio links to the network devices 210 and 220 by using a dual connectivity (DC) technology or a multi-connectivity technology. The network device 210 may be, for example, a master base station, and the network device 220 may be, for example, a secondary base station. In this case, the network device 210 is a network device initially accessed by the terminal device 230, and is responsible for radio resource control (RRC) communication with the terminal device 230. The network device 220 may be added during RRC reconfiguration, and is configured to provide additional radio resources.

Certainly, the network device 220 may alternatively be a master base station, and the network device 210 may alternatively be a secondary base station. This is not limited in this application. In addition, for ease of understanding, FIG. 2 shows only a case of wireless connections between two network devices and one terminal device. However, this should not constitute any limitation on a scenario to which this application is applicable. The terminal device may further establish radio links with more network devices.

A plurality of antennas may be configured for each communication device such as the network device 110 or the terminal device 120 in FIG. 1, or the network device 210, the network device 220, or the terminal device 230 in FIG. 2. The plurality of antennas may include at least one transmit antenna configured to send a signal and at least one receive antenna configured to receive a signal. In addition, the communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device and the terminal device may communicate with each other by using a multi-antenna technology.

It should be understood that the network device in the wireless communication system may be any device that has a wireless transceiver function. The device includes but is not limited to an evolved NodeB (eNB), a radio network controller (RNC), a NodeB (NB), a base station controller (BSC), a base transceiver station (BTS), a home base station (for example, a home evolved NodeB, or a home NodeB, (HNB)), a baseband unit (BBU), an access point (AP) in a wireless fidelity (Wi-Fi) system, a wireless relay node, a wireless backhaul node, a transmission point (TP), a transmission reception point (TRP), or the like. Alternatively, the network device may be a next generation nodeB (gNB) or a transmission point (TRP or TP) in a 5G system such as an NR system, one antenna panel or a group of antenna panels (including a plurality of antenna panels) of a base station in a 5G system, or a network node, such as a BBU or a distributed unit (DU), that constitutes a gNB or a transmission point.

In some deployments, the gNB may include a centralized unit (CU) and a DU. The gNB may further include a radio frequency unit (RU). The CU implements some functions of the gNB, and the DU implements some functions of the gNB. For example, the CU implements functions of a radio resource control (RRC) layer and a packet data convergence protocol (PDCP) layer, the DU implements functions of a radio link control (RLC) layer, a media access control (MAC) layer, and a physical (PHY) layer. Information at the RRC layer eventually becomes information at the PHY layer, or is obtained by converting information at the PHY layer. Therefore, in the architecture, higher layer signaling, for example, RRC layer signaling, may also be considered as being sent by the DU or sent by the DU and the CU. It may be understood that the network device may be a CU node, a DU node, or a device including a CU node and a DU node. In addition, the CU may be classified as a network device in a radio access network (RAN), or the CU may be classified as a network device in a core network (CN). This is not limited in this application.

It should be further understood that, the terminal device in the wireless communication system may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. In the embodiments of this application, the terminal device may be a mobile phone, a tablet computer, a computer having a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application.

For ease of understanding the embodiments of this application, the following first briefly describes several terms in this application.

1. Beam: The beam in an NR protocol may be represented by a spatial domain filter that is also referred to as a spatial filter or a spatial parameter. A beam used to send a signal may be referred to as a transmit beam (Tx beam), or may be referred to as a spatial domain transmit filter or a spatial domain transmit parameter. A beam used to receive a signal may be referred to as a receive beam (Rx beam), or may be referred to as a spatial domain receive filter or a spatial domain receive parameter.

The transmit beam may refer to distribution of signal strength formed in different directions in space after a signal is transmitted through an antenna, and the receive beam may refer to distribution of signal strength that is of a radio signal received through the antenna and that is in different directions in space.

It should be understood that the foregoing listed representation of the beam in the NR protocol is merely an example, and shall not constitute any limitation on this application. This application does not exclude a possibility of defining another term in a future protocol to represent a same or similar meaning.

In addition, the beam may be a wide beam, a narrow beam, or a beam of another type. A technology for forming the beam may be a beamforming technology or another technology. The beamforming technology may be specifically a digital beamforming technology, an analog beamforming technology, a hybrid digital/analog beamforming technology, or the like Different beams may be considered as being corresponding to different resources. Same information or different information may be sent by using different beams.

Optionally, a plurality of beams that have a same communication feature or similar communication features are considered as one beam. One beam may include one or more antenna ports, configured to transmit data, control signaling, a sounding signal, and the like. The one or more antenna ports forming the beam may also be considered as one antenna port set.

2. Beamforming: In a 5G communication system, multiple-input multiple-output (MIMO) in an LTE communication system is extended. In the LTE communication system, MIMO supports a maximum of eight antennas. However, in the 5G communication system, MIMO is extended to support 16/32/64/128 antennas, which is referred to as "massive" MIMO, that is, massive MIMO. Therefore, it may be considered that massive MIMO means supporting beams of a large quantity of antennas. Massive MIMO and beamforming complement each other. Massive MIMO is responsible for aggregating more and more antennas at a transmit end and a receive end. Beamforming is responsible for directing each signal to an optimal path of a terminal receiver to improve signal strength and avoid signal interference, and therefore improve communication quality.

Through beamforming, a plurality of antennas can be used to obtain a narrow beam, and the narrow beam has specific directivity. In addition, a larger quantity of antennas used for beamforming indicates higher directivity of the narrow beam. A network device and a terminal device each can form a transmit or receive beam with high directivity by using a plurality of transmit or receive antennas, and efficient data transmission can be performed only when a transmit beam and a receive beam are in approximately the same direction.

To effectively manage a transmit beam direction and a receive beam direction, a beam management mechanism is introduced. A purpose of the beam management mechanism is to align a transmit beam direction with a receive beam direction, which may also be referred to as beam matching or beam pairing. The beam management mechanism may also be used to quickly recover matching of a transmit beam and a receive beam that are out of match. Usually, for a carrier in a high frequency band, for example, a carrier in a frequency range (FR) 2 frequency band, beamforming and the beam management mechanism need to be applied to communication.

3. Beam matching relationship: The beam matching relationship is a matching relationship between a transmit beam and a receive beam, that is, a matching relationship between a spatial transmit filter and a spatial receive filter. A large beamforming gain can be obtained by transmitting a signal between a transmit beam and a receive beam that have a beam matching relationship.

In an implementation, a transmit end and a receive end may obtain a beam matching relationship through beam training. Specifically, the transmit end may send a reference signal in a beam sweeping manner, and the receive end may also receive the reference signal in the beam sweeping manner. Specifically, the transmit end may form different directional beams in space in a beamforming manner, and may perform polling on a plurality of different directional beams, to transmit a reference signal by using the different directional beams, so that a power of transmitting the reference signal can reach a maximum value when the reference signal is transmitted in a direction directed by a transmit beam. In this case, the direction directed by the transmit beam may be referred to as a transmit beam direction. The receive end may also form different directional beams in space in the beamforming manner, and may perform polling on a plurality of different directional beams, to receive the reference signal by using the different directional beams, so that a power of receiving the reference signal by the receive end can reach a maximum value when the reference signal is received in a direction directed by a receive beam. In this case, the direction directed by the receive beam may be referred to as a receive beam direction.

By traversing transmit beams and receive beams, the receive end may perform channel measurement based on the received reference signal, and report a measurement result to the transmit end by using CSI. For example, the receive end may report some reference signal resources with large reference signal received powers (RSRPs) to the transmit end, for example, report identifiers of the reference signal resources, so that the transmit end receives and sends, during transmission of data or signaling, signals by using a beam pairing relationship with relatively good channel quality.

4. Reference signal and reference signal resource: The reference signal may be used for channel measurement, channel estimation, or the like. The reference signal resource may be used to configure transmission attributes, for example, a time-frequency resource position, a port mapping relationship, a power factor, and a scrambling code, of the reference signal. For details, refer to a current technology. A transmit end device may send the reference signal based on the reference signal resource, and a receive end device may receive the reference signal based on the reference signal resource.

The channel measurement in this application also includes beam measurement. To be specific, beam quality information is obtained by measuring a reference signal. A parameter used to measure beam quality includes an RSRP, but is not limited thereto. For example, beam quality may alternatively be measured by using parameters such as reference signal received quality (RSRQ), a signal-to-noise ratio (SNR), and a signal to interference plus noise ratio (SINR). In the embodiments of this application, for ease of description, unless otherwise specified, the channel measurement may be considered as the beam measurement.

The reference signal may include, for example, a channel state information reference signal (CSI-RS), a synchronization signal block (SSB), and a sounding reference signal (SRS). Correspondingly, the reference signal resource may include a CSI-RS resource, an SSB resource, and an SRS resource.

It should be noted that the SSB may also be referred to as a synchronization signal/physical broadcast channel block (SS/PBCH block), and the corresponding SSB resource may also be referred to as a synchronization signal/physical broadcast channel block resource that may be briefly referred to as the SSB resource.

To distinguish between different reference signal resources, each reference signal resource may correspond to one reference signal resource identifier, for example, a CSI-RS resource indicator (CRI), an SSB resource indicator (SSBRI), or an SRS resource index (SRI).

The SSB resource indicator may also be referred to as an SSB index.

In the embodiments of this application, "a resource" may be understood as "a time domain resource and/or a frequency domain resource and/or a spatial domain resource". The time domain resource may be one or more symbols, or one or more slots. The frequency domain resource may be one or more resource blocks (RBs), one or more resource elements (REs), or one or more carriers. Spatial domain refers to a spatial direction, and the spatial domain resource may be one or more beam directions, or the like. This is not limited in the embodiments of this application.

It should be understood that, the reference signal and the corresponding reference signal resource that are listed above are merely examples for description, and shall not constitute any limitation on this application. This application does not exclude a possibility of defining another reference signal in a future protocol to implement a same or similar function.

5. Cell: The cell is described by a higher layer from a perspective of resource management, mobility management, or a service unit. Coverage of each network device may be divided into one or more serving cells, and the serving cell may be considered as including a specific frequency domain resource.

It should be noted that the cell may be an area within coverage of a wireless network of the network device. In the embodiments of this application, different cells may correspond to different network devices. For example, a network device in a cell #1 and a network device in a cell #2 may be different network devices, for example, base stations. In other words, the cell #1 and the cell #2 may be managed by different base stations. In this case, it may be referred that the cell #1 and the cell #2 are not co-sited, or are not served by a same base station. The network device in the cell #1 and the network device in the cell #2 may also be different radio frequency processing units of a same base station, for example, radio remote units (RRUs). In other words, the cell #1 and the cell #2 may be managed by a same base station and have a same baseband processing unit and a same intermediate frequency processing unit, but have different radio frequency processing units. This is not particularly limited in this application.

6. Carrier aggregation (CA): To efficiently use fragmented spectrums, a system supports aggregation between different component carriers. A technology that aggregates two or more carriers to support a larger transmission bandwidth may be referred to as carrier aggregation.

Carrier aggregation is specific for a terminal device. Different terminal devices may be configured with different CCs, and each CC may correspond to one independent cell. In an example, each downlink CC corresponds to one independent cell. In other words, one cell includes only one downlink CC. Therefore, usually, one downlink CC may be equivalent to one cell. One cell may include only one downlink carrier, or may include one downlink carrier and one uplink carrier, or may include one downlink carrier and two uplink carriers. The carrier in the embodiments of this application is a downlink carrier unless otherwise specified.

For a terminal device in connected mode, if carrier aggregation is not configured, the terminal device has one serving cell, or if carrier aggregation is configured, the terminal device may have a plurality of serving cells, which may be referred to as a serving cell set. For example, the serving cell set of the terminal device includes a primary cell and a secondary cell. In other words, the serving cell set includes one primary cell and at least one secondary cell. In other words, a terminal configured with carrier aggregation may be connected to one PCell and a plurality of SCells.

For example, the network device 110 shown in FIG. 1 may configure carrier aggregation for the terminal device 120.

7. Dual connectivity (DC): A terminal device may simultaneously have communication connections to at least two network devices and may send and receive data. This may be referred to as dual connectivity or multi-connectivity. In the at least two network devices, an access network device that is responsible for exchanging a radio resource control message with the terminal device and is responsible for interacting with a core network control plane entity may be referred to as a master mode (MN), and another access network device may be referred to as a secondary node (SN). In other words, at least two carriers used for aggregation are on different network devices.

During dual connectivity DC configuration, usually, a serving cell, of the terminal device, that is served by the master node includes a primary cell PCell and zero to n secondary cells SCells. A serving cell, of the terminal device, that is served by the secondary node includes a primary secondary cell (PSCell) and zero to m secondary cells SCells. Herein, n and m are respectively positive integers greater than 1.

For example, as shown in FIG. 2, dual connectivity may be configured for the terminal device 230 and the network devices 210 and 220.

Usually, a configured SCell other than the PCell cannot be used immediately after being configured.

Figure 3:
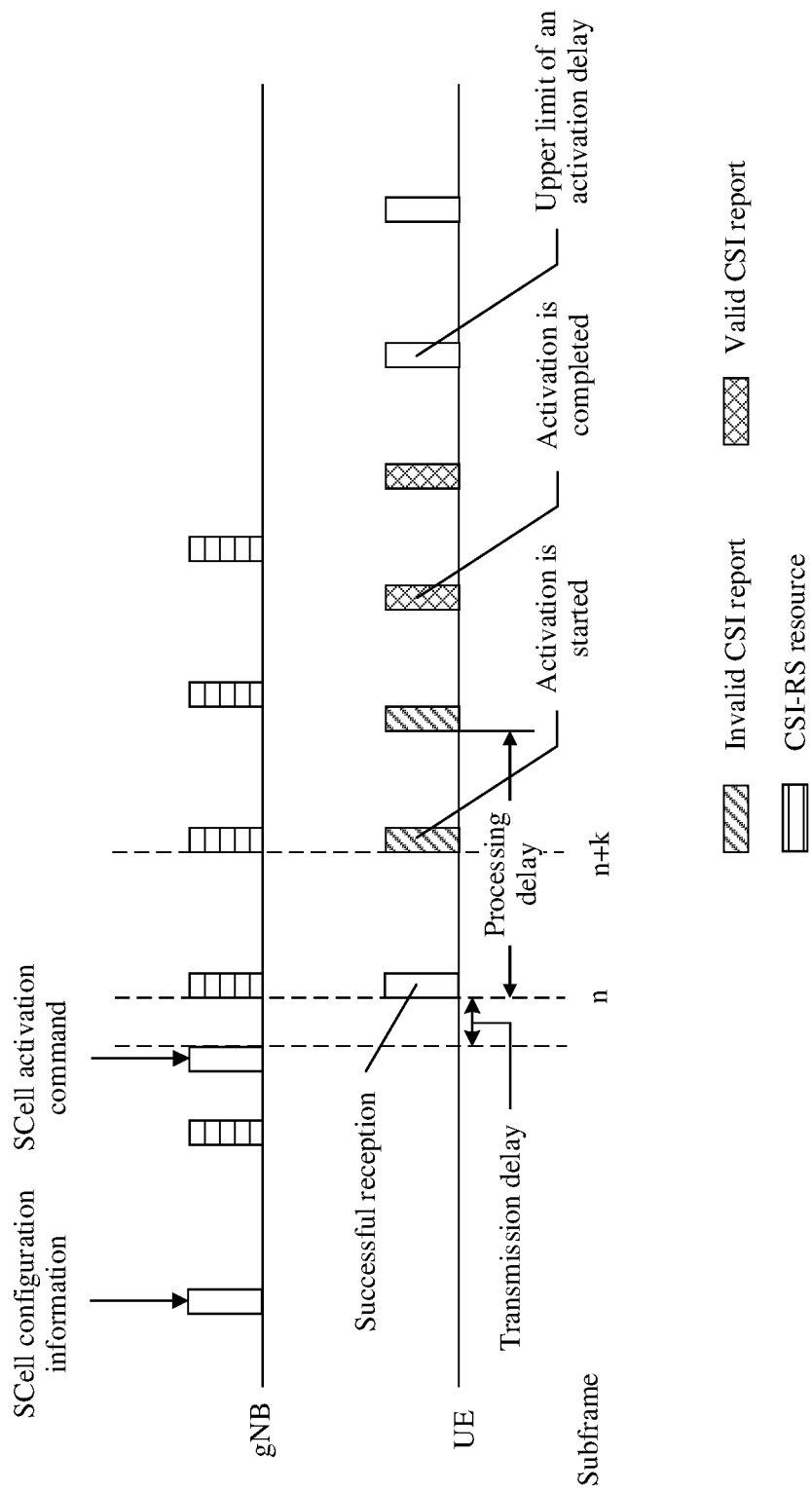
FIG. 3 is a schematic diagram of an SCell activation process.

To better manage battery consumption of a terminal device configured with CA or DC, an SCell activation mechanism is provided. FIG. 3 is a schematic diagram of an SCell activation process. In FIG. 3, an example in which a network device is a gNB and a terminal device is UE is used for description. As shown in FIG. 3, a basic procedure of SCell activation is as follows.

(1) The network-side gNB configures an SCell. Specifically, when an SCell is added for a terminal at a network side, the network-side gNB sends SCell configuration information to the UE, where the SCell configuration information includes configuration information of a CSI-RS resource in the SCell. In an example, the gNB may send the SCell configuration information to the UE by using RRC signaling. In some possible descriptions, the CSI-RS resource may also be referred to as a CSI measurement resource.

In some possible implementations, as shown in FIG. 3, the CSI-RS resource may be a periodic measurement resource. Alternatively, in other implementations, the CSI-RS resource may be an aperiodic measurement resource.

(2) The network-side gNB sends an SCell activation command. In an example, the gNB may send the SCell activation command to the UE in a form of a medium access control control element (MAC CE).

(3) When successfully receiving the SCell activation command in a slot n, the UE starts to perform a related process of the SCell activation. It should be noted that a time interval between a slot in which the gNB sends the SCell activation command to a slot (that is, the slot n) in which the UE successfully receives the SCell activation command is a transmission delay.

In some implementations, the UE may start to perform CSI reporting in a slot n+k as required by a protocol. For example, in the slot n+k, the UE sends an invalid CSI report to the gNB, indicating that the SCell activation starts. Further, the UE sends a valid CSI report to the gNB, indicating that the SCell activation is completed. In an example, valid CSI is obtained based on measurement performed by the UE and corresponds to any a channel quality indicator (CQI) index whose value is not 0. A CQI index whose value is 0 corresponds to a meaning of out of range, indicating that CSI is invalid CSI. A report including valid CSI is a valid CSI report, and a report including invalid CSI is an invalid CSI report. For example, the network device may not process the invalid CSI report. The network device may obtain, based on the valid CSI report, valid CSI measured by the terminal device.

For example, the CSI may include at least one of the following information, including a channel quality indicator (CQI), a precoding matrix indication (PMI), a CSI-RS resource indicator (CRI), an SSB resource indicator (SSBRI), a layer indicator (LI), a rank indicator (RI), and a layer 1 reference signal received power (L1-RSRP).

As shown in FIG. 3, a time interval between the slot n and the slot n+k is a processing delay. In an example, the processing delay may include time for sending a hybrid automatic repeat request acknowledgment (HARQ-ACK), time for MAC CE parsing, time for radio frequency (RF) preparation, and the like. This is not limited in this embodiment of this application.

In addition, behavior of the UE performed after the SCell activation other than CSI reporting is performed not earlier than the slot n+k and not later than an upper limit of an activation delay. In an example, the upper limit of the activation delay may be a minimum activation delay upper limit defined by the 3rd generation partnership project 3GPP radio access network work group 4 (RAN4). To be specific, activation time of one SCell cannot be greater than this value, and the value may be represented by k_uplimit. In other words, a time point at which the SCell activation process is completed needs to be within the time period k_uplimit starting from the slot n+k.

In an example, a value of k may be as follows:

$$k = k_1 + 3 \cdot N_{slot}^{subframe,\mu} + 1 \quad (1)$$

where $k_1$ represents a time interval between a time point at which downlink data is sent to a time point at which a HARQ-ACK feedback for the data is sent, and $N_{slot}^{subframe,\mu}$ represents a quantity of slots included in a subframe under a configuration of a subcarrier spacing μ of PUCCH transmission.

In an example, a value of k_uplimit may be as follows:

$$k\_uplimit = T_{HARQ} + T_{activation\_time} + T_{CSI\_Reporting} \quad (2)$$

$T_{HARQ}$ corresponds to time represented by $k_1$, $T_{CSI\_Reporting}$ corresponds to preparation time and processing time of CSI reporting, and $T_{activation\_time}$ corresponds to time for SCell activation. A value of $T_{activation\_time}$ is related to a plurality of factors, including parameters such as a frequency range (FR 1 or FR 2) of the SCell, a prior state (known or unknown) of the SCell, a measurement periodicity of the SCell, and a measurement periodicity of an SSB in the SCell.

Table 1 shows an example of frequency range division used for 5G communication in an NR protocol.

TABLE 1

| Frequency range designation | Corresponding frequency range |
| --- | --- |
| FR 1 | 450 MHz to 6000 MHz |
| FR 2 | 24250 MHz to 52600 MHz |

That the SCell is in the FR 1, the prior state of the SCell is the known state, the measurement periodicity of the SCell is less than or equal to 160 ms, and the measurement periodicity of the SSB is $T_{SMTC\_SCell}$ seen is used as an example, and the value of $T_{activation\_time}$ is as follows:

$$T_{activation\_time} = 5 \text{ ms} + 1 * T_{SMTC\_SCell} \quad (3)$$

(4) The UE reports a valid CSI report to complete the SCell activation process. In other words, reporting a valid CSI report by the UE indicates completion of the SCell activation process. In an example, reporting a valid CSI report by the UE for the first time may indicate completion of the activation process. This means that the SCell activation process can be completed and the SCell enters an activated state only after the UE obtains valid CSI information.

Alignment of transmit and receive beams is not considered in the foregoing SCell activation process.

If an SCell that needs to be activated belongs to a low frequency range (for example, the frequency range FR 1), the UE may use an omnidirectional antenna receiving manner, so that the UE can receive CSI-RS signals that are sent by the gNB in all directions. In this case, alignment of transmit and receive beams may not need to be considered in an SCell activation process. However, if an SCell that needs to be activated belongs to a high frequency range (for example, the frequency range FR 2) but beam matching is not performed, misalignment of transmit and receive beams of a high frequency CSI-RS signal may occur. As a result, the UE cannot correctly monitor a CSI-RS resource configured by the gNB and cannot obtain valid CSI information. Consequently, an SCell activation process cannot be completed within required time and SCell activation finally fails.

In view of this, the embodiments of this application provide a secondary cell SCell activation method. In an SCell activation process, a process of performing beam management on a terminal device is added, so that a network device can obtain receive beam direction information of the terminal device in the SCell activation process, and then configures a CSI-RS resource based on the receive beam direction information. Therefore, the terminal device can obtain valid CSI information, and the SCell activation process is completed. In the embodiments of this application, because the CSI-RS resource can be configured based on the receive beam direction information, a problem of an SCell activation failure caused by misalignment of transmit and receive beams of a CSI-RS signal can be resolved. This is applicable to a scenario of high frequency communication.

The following describes the embodiments of this application in detail with reference to the accompanying drawings.

It should be understood that terms "first", "second", and various numerical symbols in the following embodiments are merely used for differentiation for ease of description, but are not intended to limit the scope of the embodiments of this application. For example, the terms are used to distinguish between different CSI reports and different indication information.

It should be further understood that, in the following embodiments, "pre-obtaining" may include being indicated by a network device by using signaling or being predefined, for example, being defined in a protocol. "Pre-definition" may be implemented by prestoring corresponding code or a corresponding table in a device (for example, including a terminal device and a network device), or in another manner that may be used to indicate related information. A specific implementation is not limited in this application.

It should be further understood that "being stored" in the embodiments of this application may be "being stored in one or more memories". The one or more memories may be separately disposed, or may be integrated into an encoder or a decoder, a processor, or a communication apparatus. Alternatively, a part of the one or more memories may be separately disposed, and a part of the one or more memories are integrated into a decoder, a processor, or a communication apparatus. A type of the memory may be any form of storage medium. This is not limited in this application.

It should be further understood that, the "protocol" in the embodiments of this application may be a standard protocol in the communication field, for example, may include an LTE protocol, an NR protocol, and a related protocol applied to a future communication system. This is not limited in this application.

The technical solutions in this application may be used in a wireless communication system, for example, the communication system too shown in FIG. 1 or the communication system 200 shown in FIG. 2. There may be a wireless communication connection relationship between two communication apparatuses in the wireless communication system. For example, one of the two communication apparatuses may correspond to the network device no shown in FIG. 1, and for example, may be the network device no or a chip configured in the network device no. For example, the other of the two communication apparatuses may correspond to the terminal device 120 in FIG. 1, and for example, may be the terminal device 120 or a chip configured in the terminal device 120. For another example, one of the two communication apparatuses may correspond to the network device 210 shown in FIG. 2, and for example, may be the network device 210 or a chip configured in the network device 210. For another example, the other of the two communication apparatuses may correspond to the terminal device 230 shown in FIG. 2, and for example, may be the terminal device 230 or a chip configured in the terminal device 230. For still another example, one of the two communication apparatuses may correspond to the network device 220 shown in FIG. 2, and for example, may be the network device 220 or a chip configured in the network device 220. For still another example, the other of the two communication apparatuses may correspond to the terminal device 230 shown in FIG. 2, and for example, may be the terminal device 230 or a chip configured in the terminal device 230.

Without loss of generality, the following describes in detail the embodiments of this application first by using a secondary cell SCell activation process of a terminal device as an example. It may be understood that any terminal device in a wireless communication system or a chip configured in the terminal device may activate a secondary cell based on a same method, and any network device in the wireless communication system or a chip configured in the network device may activate the secondary cell based on a same method. This is not limited in this application.

Figure 4:
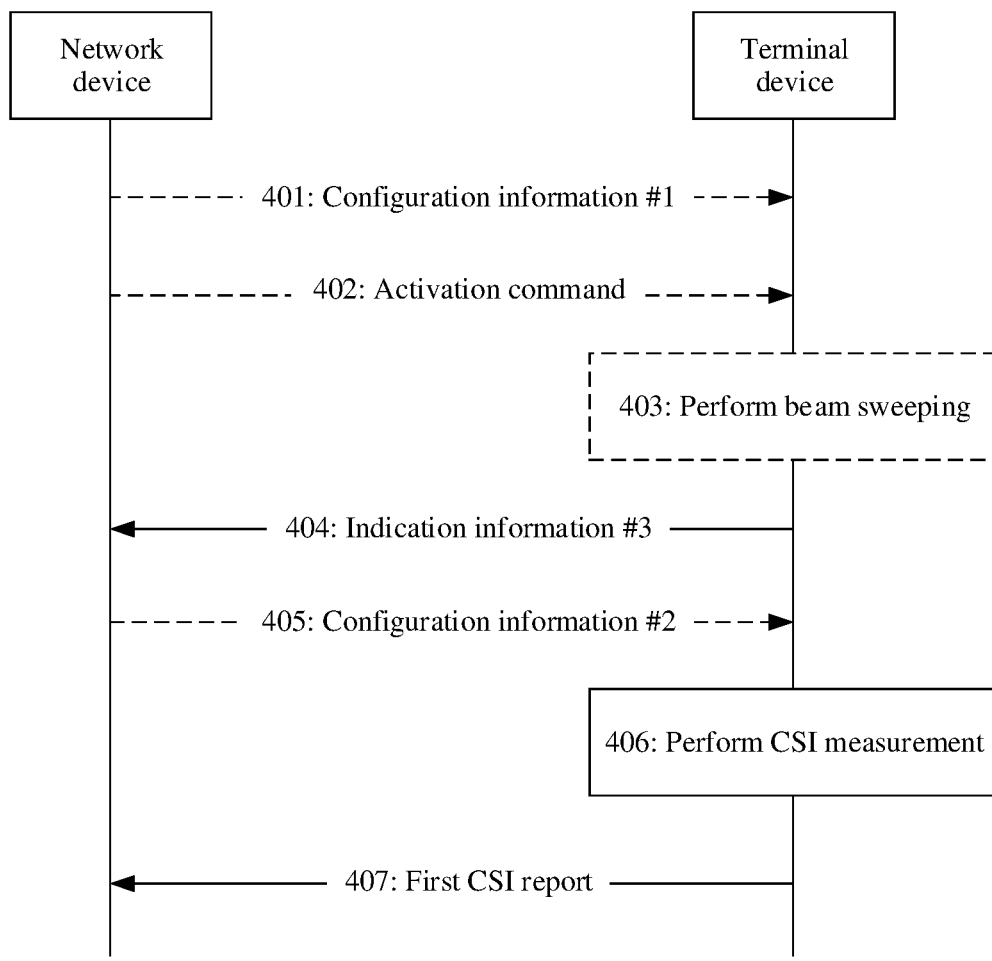
FIG. 4 is a schematic flowchart of a secondary cell activation method according to an embodiment of this application.

FIG. 4 is a schematic flowchart, shown from a perspective of device interaction, of a secondary cell activation method 400. It should be understood that FIG. 4 shows steps or operations of the secondary cell activation method, but these steps or operations are merely examples. In the embodiments of this application, other operations or variations of the operations in FIG. 4 may be further performed. In addition, the steps in FIG. 4 may be performed in a sequence different from that presented in FIG. 4, and possibly, not all the operations in FIG. 4 need to be performed.

As shown in FIG. 4, the method 400 may include step 401 to step 407. The following describes the steps in the method 400 in detail with reference to FIG. 4.

Optionally, 401: A network device sends configuration information #1 to a terminal device. Correspondingly, the terminal device receives the configuration information #1 from the network device.

In an example, the configuration information #1 may include a configuration of a CSI report used for activation of a secondary cell SCell. For example, a frequency of the SCell may belong to a frequency range FR 2, and the terminal device has no other active cell in an FR 2 frequency band. A PCell or a PSCell is within a frequency range FR 1.

Optionally, the configuration information #1 may be used to configure a CSI-RS resource used to activate the SCell of the terminal device, and the CSI-RS resource is used by the terminal device to perform CSI measurement and obtain a first CSI report. The first CSI report is used to activate the SCell. In an example, when the first CSI report is a valid CSI report, the SCell is activated.

Optionally, the configuration information #1 may be used to indicate a report quantity of a second CSI report. An information element (IE) corresponding to the report quantity may include one or more of the following parameters, including a CQI, a PMI, a CRI, an SSBRI, an LI, an RI, an L1-RSRP, a composite codebook index (it), and a physical downlink shared channel (PDSCH) bundle size for CSI (pdsch-BundleSizeForCSI).

Figure 5:
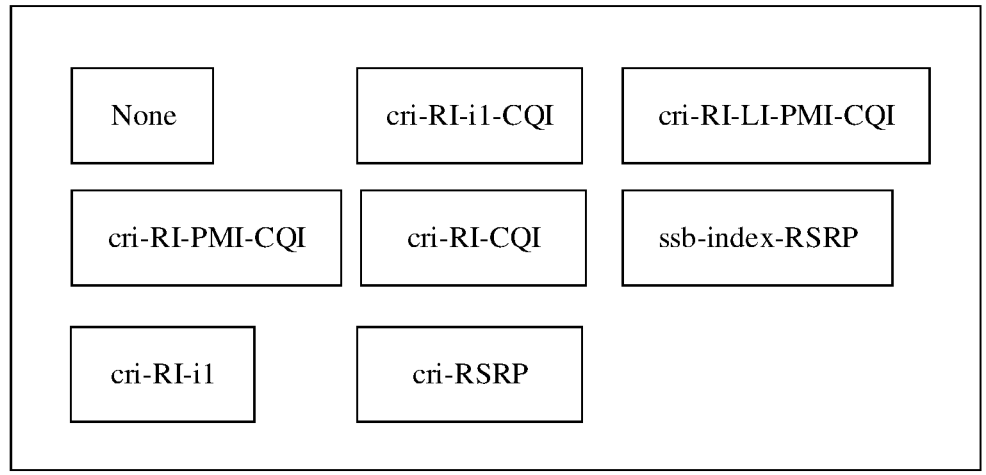
FIG. 5 shows an example of a report quantity information element IE according to an embodiment of this application.

FIG. 5 shows an example of a report quantity IE. The report quantity IE includes none, or one of cri-RI-i1-CQI, cri-RI-LI-PMI-CQI, cri-RI-PMI-CQI, cri-RI-CQI, ssb-index-RSRP, cri-RI-i1, cri-RSRP, or the like. A plurality of parameters connected by hyphens form a combination. However, this embodiment of this application is not limited to the combination manner shown herein. ssb-index-RSRP indicates an RSRP corresponding to each SSB index, and cri-RSRP indicates an RSRP corresponding to a CSI-RS resource ID.

In an example, a structure of the reportQuantity IE in FIG. 5 may correspond to the following code:

```
reportQuantity           CHOICE{
    none                 NULL,
    cri-RI-PMI-CQI           NULL,
    cri-RI-i1            NULL,
    cri-RI-i1-CQI            SEQUENCE{
    pdsch-BundleSizeForCSI   ENUMERATED{n2, n4}
OPTIONAL --Need S
    },
    cri-RI-CQI           NULL,
    cri-RSRP             NULL,
    ssb-Index-RSRP           NULL,
    cri-RI-LI-PMI-CQI        NULL,
},
```

In an optional embodiment, the configuration information #1 may be used to configure the terminal device to report receive beam direction information of the terminal device, where the receive beam direction information is used to determine the CSI-RS resource for activating the secondary cell of the terminal device. In an example, the configuration information #1 may include an information element used to indicate the terminal device to report the receive beam direction information. In this case, the configuration information #1 may be used as an example of second indication information. The second indication information is information sent by the network device to the terminal device. The second indication information is used to indicate the report quantity of the second CSI report, and includes the information element used to indicate the terminal device to report the receive beam direction information of the terminal device.

The receive beam direction information may be information used to indicate a receive beam direction of the terminal device. In an example, a power at which the terminal device receives a reference signal may reach a maximum value in the receive beam direction. It should be noted that when a transmit beam direction is aligned with the receive beam direction, the transmit beam direction of the network device is the receive beam direction of the terminal device. Therefore, the transmit beam direction of the network device may be used to represent the receive beam direction of the terminal device.

In an example, that the terminal device reports the receive beam direction information may mean that the terminal device reports a reference signal resource whose RSRP (or another measurement result) is large, for example, reports an identifier of the reference signal resource, so that the network device receives and sends signals by using a beam pairing relationship with relatively good channel quality during transmission of data and signaling. Herein, "transmission" refers to sending and/or receiving.

Optionally, the receive beam direction information includes the identifier of the reference signal resource. The identifier of the reference signal resource is, for example, a CSI-RS resource indicator (CRI), an SSB resource indicator (SSBRI), or an SRS resource index (SRI). This is not limited in this embodiment of this application. The SSBRI or the SRI may also be referred to as an SSB resource indication, and the CRI may also be referred to as a CSI-RS resource indication.

Specifically, for the beam, the receive beam direction, the reference signal, and the reference signal resource, refer to the foregoing descriptions. For brevity, details are not described herein again.

Figure 6:
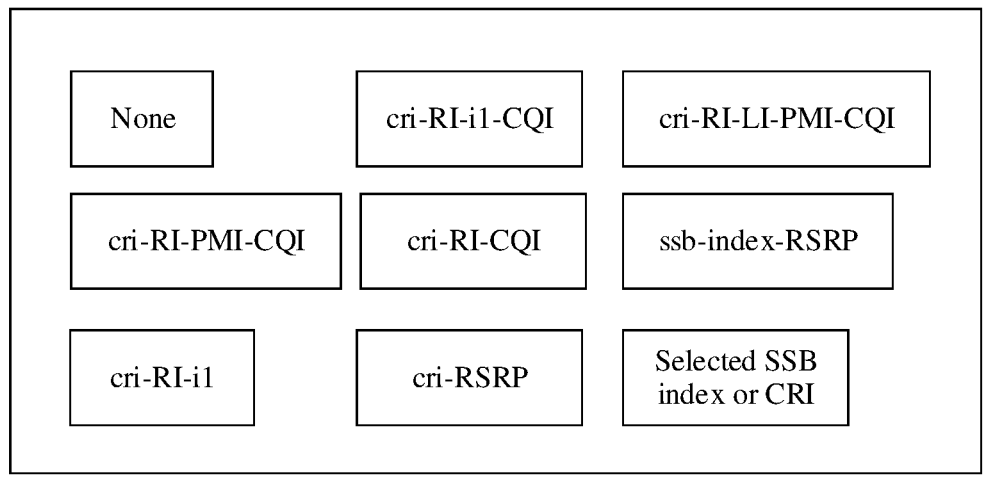
FIG. 6 shows an example of a report quantity IE according to an embodiment of this application.

FIG. 6 shows another example of a report quantity IE according to an embodiment of this application. Based on the indication of the configuration information #1, a report quantity in the report quantity IE is extended in this embodiment of this application. In other words, the configuration information #1 further indicates the receive beam direction information of the UE in the second CSI report. In an example, as shown in FIG. 6, an information element of a selected SSB index or CRI may be added relative to FIG. 5, to indicate the receive beam direction information. The selected SSB index information element may indicate the UE to report an index of a selected downlink SSB. The CRI information element may indicate the UE to report an identifier of a selected CSI-RS resource. Herein, the index of the SSB or the identifier of the CSI-RS resource corresponds to a specific downlink beam direction.

In an example, a structure of the reportQuantity IE in FIG. 6 may correspond to the following code:

```
reportQuantity           CHOICE{
    none                 NULL,
    cri-RI-PMI-CQI           NULL,
    cri-RI-i1            NULL,
    cri-RI-i1-CQI            SEQUENCE{
    pdsch-BundleSizeForCSI   ENUMERATED{n2, n4}
OPTIONAL --Need S
    },
    cri-RI-CQI           NULL,
    cri-RSRP             NULL,
    ssb-Index-RSRP           NULL,
    cri-RI-LI-PMI-CQI        NULL,
    Selected SSB index       NULL,
    Selected CRI             NULL,
},
```

Newly Added Information in the Structure of the reportQuantity IE is:

```
Selected SSB index       NULL,
Selected CRI             NULL,
```

Optionally, the network device may further configure, for the terminal device, a reference signal resource used for beam sweeping. In an example, the network device may send indication information #1 to the terminal device, to indicate an SSB resource or a CSI-RS resource used for beam sweeping. In some possible implementations, the indication information #1 may include an SSBRI, an SRI, or a CRI used for beam sweeping. This is not limited in this embodiment of this application.

For example, the configuration information #1 may include the indication information #1, or the indication information #1 may be carried in another message or other signaling, or the indication information #1 may be separately sent. This is not limited in this embodiment of this application.

In some possible implementations, the reference signal resource used for beam sweeping may be periodic, or may be aperiodic or semi-persistent. The periodic reference signal resource may be used by the terminal device to perform CSI measurement for a plurality of times (two or more times). The semi-persistent reference signal resource may be used by the terminal device to perform CSI measurement for a period of time, and the semi-persistent reference signal resource can be used only after being activated. The aperiodic reference signal resource may be used by the terminal device to perform CSI measurement once. The periodic reference signal resource may be an SSB resource or a periodic CSI-RS resource. The aperiodic reference signal resource may be an aperiodic CSI-RS resource. The semi-persistent reference signal resource may be a semi-persistent CSI-RS resource.

In some implementations, the network device may activate or deactivate the semi-persistent CSI-RS resource by using a MAC CE.

Optionally, the network device may further configure, for the terminal device, a resource for reporting a CSI report (which may be referred to as a CSI reporting resource) by the terminal device. In an example, the network device may send indication information #2 to the terminal device, to indicate the resource used by the terminal device to report the CSI report. In an example, the CSI report may be the second CSI report corresponding to the report quantity information element shown in FIG. 5 or FIG. 6.

For example, the configuration information #1 may include the indication information #2, or the indication information #2 may be carried in another message or other signaling, or the indication information #2 may be separately sent. This is not limited in this embodiment of this application.

In some possible implementations, the CSI reporting resource may be periodic, or may be aperiodic or semi-persistent. The periodic CSI reporting resource may be used by the terminal device to report a CSI measurement result for a plurality of times (two or more times), or may be used to report a CSI measurement result when accurate reporting time cannot be obtained. The semi-persistent CSI reporting resource may be used by the terminal device to report a CSI measurement result for a period of time. The semi-persistent resource can be used only after being activated. The aperiodic reference signal resource may be used by the terminal device to report a CSI measurement result once. It should be noted that CSI reports may be classified into a periodic CSI report, an aperiodic CSI report, and a semi-persistent CSI report based on different CSI reporting resources. However, this is not limited in this embodiment of this application.

In addition, the aperiodic CSI report may be triggered by using downlink control information (DCI). In other words, the network device needs to send DCI to the terminal device, to trigger the terminal device to report a CSI measurement result. It should be noted that in this case, because only a resource used for CSI reporting once is provided for the aperiodic CSI report, the network device needs to (accurately) predict reporting time of the CSI measurement result obtained by the terminal device.

In some implementations, the network device may activate or deactivate the semi-persistent CSI report by using a MAC CE.

It should be noted that, because a time point at which the terminal device starts to perform CSI measurement and a time point at which the terminal device obtains a beam measurement sweeping result are not easy to predict, the periodic reference signal resource and the periodic CSI report may be preferentially selected. However, this embodiment of this application is not limited thereto.

In some possible implementations, the network device may send the configuration information #1 by using RRC signaling. However, this embodiment of this application is not limited thereto. When the network device configures the CSI report by using RRC signaling, an information element in the configuration information #1 may also be referred to as an RRC configuration parameter.

In some optional embodiments, the terminal device may pre-obtain some or all configurations corresponding to the configuration information #1. This is not limited in this embodiment of this application. In a possible implementation, when the terminal device pre-obtains all the configurations corresponding to the configuration information #1, step 401 may not be performed.

Optionally, 402: The network device sends an activation command to the terminal device. The activation command is used to indicate the terminal device to activate the SCell. Specifically, for the activation command, refer to the descriptions of the SCell activation command in FIG. 3. For brevity, details are not described herein again.

In some possible implementations, the network device may send the activation command to the terminal device in a form of a MAC CE. Alternatively, in another implementation, the network device may further send the activation command to the terminal device by using RRC signaling or DCI. This is not limited in this embodiment of this application. For example, the configuration information #1 may include the activation indication. That is, during SCell configuration, the terminal device is indicated to start to activate the SCell. In this case, the network device may perform step 401, but does not need to perform step 402.

Correspondingly, the terminal device may receive the activation command sent by the network device.

In some optional embodiments, when the configuration information #1 in step 401 does not indicate the terminal device to report the receive beam direction information, and the terminal device receives, in step 402, the SCell activation command sent by the network device, the terminal device may determine that beam sweeping needs to be performed, and include a beam sweeping result in the second CSI report, where the beam sweeping result includes the receive beam direction information. Optionally, the configuration information #1 may be used as an example of third indication information. The third indication information is information sent by the network device to the terminal device, and is used to indicate the report quantity of the second CSI report. In this case, the third indication information does not include the information element used to indicate the terminal device to report the receive beam direction of the terminal device.

In an example, the configuration information #1 is used to indicate a report quantity IE corresponding to the second CSI report, for example, the report quantity IE shown in FIG. 5. In other words, the report quantity IE may reuse a current structure, and a new IE does not need to be added to indicate the terminal device to report the beam sweeping result. For example, the network device may reuse ssb-Index-RSRP to indicate the terminal device to report the receive beam direction information, where the receive beam direction information is an SSB index selected by the terminal device, or reuse cri-RSRP to indicate the terminal device to report the receive beam direction information, where the receive beam direction information is a CRI selected by the terminal device.

In some optional embodiments, when the configuration information #1 in step 401 does not indicate the terminal device to report the receive beam direction information, and the terminal device does not receive the SCell activation command sent by the network device, the terminal device determines that the receive beam direction information does not need to be reported.

403: The terminal device performs beam sweeping to obtain a beam sweeping result, where the beam sweeping result includes the receive beam direction information.

In some possible implementations, the terminal device may perform beam sweeping based on the configuration information #1. In an example, when the configuration information #1 is used to indicate the report quantity of the second CSI and includes the information element used to indicate the terminal device to report the receive beam direction information, the terminal device performs beam sweeping. In another example, when the configuration information #1 is used to indicate the report quantity of the second CSI, and the terminal device further receives the SCell activation command, the terminal device performs beam sweeping.

In some possible implementations, the terminal device may perform beam sweeping by using a resource configured by the network device for beam sweeping. For example, the resource used for beam sweeping may be an SSB or a CSI-RS resource. This is not limited in this embodiment of this application.

In a beam sweeping process, the terminal device may obtain an intermediate beam sweeping result and a final beam sweeping result. The following uses an example in which the terminal device performs beam sweeping by using an SSB for description.

The SSB corresponds to a resource of a cell, and is sent at a specific periodicity in terms of time. A half-frame (for example, 5 ms) is occupied for each time of sending. In addition, a plurality of SSB resources are included in the half-frame occupied for SSB sending, each SSB resource corresponds to a specific beam direction, and each SSB resource has a corresponding sequence number, which is referred to as an SSB index.

In a downlink beam management process, both the network device and the terminal device change beam directions. Specifically, the network device sends SSBs in different downlink beam directions, and the terminal device correspondingly changes receive beam directions. Therefore, in the beam sweeping process, the terminal device may obtain a plurality of beam sweeping results, including the intermediate beam sweeping result and the final beam sweeping result. The intermediate beam sweeping result is obtained by the terminal device when the terminal device does not complete the beam sweeping process, and the final beam sweeping result is obtained by the terminal device after the terminal device completes the beam sweeping process. In other words, a power of a received reference signal corresponding to a receive beam direction indicated in the final beam sweeping result is the largest.

It should be noted that because receive beam sweeping performed by the terminal device is completed through internal implementation of the terminal device, the network device does not know when the terminal device can complete the entire beam sweeping process.

In some optional embodiments, if the terminal device stores the beam sweeping result or the receive beam direction information, the terminal device may not perform step 403.

404: The terminal device sends indication information #3 to the network device. Correspondingly, the network device receives the indication information #3 sent by the terminal device. The indication information #3 is used to indicate the receive beam direction information, and the receive beam direction information is used to determine the CSI-RS resource for activating the secondary cell of the terminal device. For example, the indication information #3 is an example of first indication information.

In some optional embodiments, when the configuration information #1 is used to indicate the report quantity of the second CSI report, the terminal device may send the second CSI report to the network device. The second CSI report includes the receive beam direction information. In other words, the second CSI report may include the indication information #3.

Optionally, the terminal device may further indicate, to the network device, whether the receive beam direction information sent in step 404 is valid.

In some possible implementations, the indication information #3 may further include a valid indication, and the valid indication is used to indicate that the receive beam direction information is valid, or is used to indicate that the receive beam direction is invalid. Because the network device does not know when the terminal device can complete the beam sweeping process to obtain an available beam sweeping result, the terminal device may indicate, to the network device, whether the beam sweeping result is valid, that is, whether the beam sweeping result is the final beam sweeping result or whether the beam sweeping result is an available beam sweeping result.

In some possible cases, when the preconfigured CSI reporting resource arrives, the terminal device may report the second CSI report to the network device. The second CSI report includes the receive beam direction information of the terminal device. In some possible implementations, the second CSI report may include the beam sweeping result, and the beam sweeping result may include the receive beam direction information of the terminal device. Optionally, the beam sweeping result may further include signal strength of the receive beam direction or other information. This is not limited in this embodiment of this application.

Figure 7:
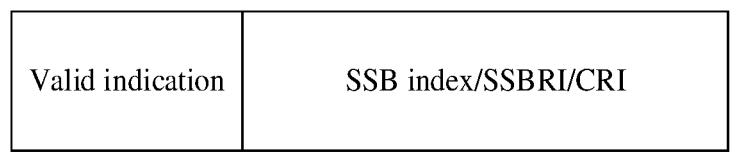
FIG. 7 shows an example of an information structure of a CSI feedback field according to an embodiment of this application.

In an example, the terminal device may report the beam sweeping result by using a newly defined information structure of a CSI feedback field. FIG. 7 shows an example of the information structure of the CSI feedback field according to this embodiment of this application. The information structure of the CSI feedback field includes two information fields. One information field includes the beam sweeping result. The beam sweeping result includes the receive beam information, such as an SSB index, an SSBRI, or a CRI. The other information field includes the valid indication, and is used to indicate whether the beam sweeping result is a final valid beam sweeping result.

For example, when the valid indication is 1, it indicates that the SSB index/SSBRI/CRI is valid, that is, the network device may configure the CSI-RS resource based on the SSB index/SSBRI/CRI. When the valid indication is 0, it indicates that the SSB index/SSBRI/CRI is invalid. In an example, the SSB index/SSBRI/CRI may be an intermediate beam sweeping result or an invalid measurement result. Correspondingly, the network device may ignore the invalid SSB index/SSBRI/CRI.

In some possible implementations, the terminal device may separately send the valid indication. Further, the valid indication may be sent before or after the first indication information, to indicate validity of the first information. This is not limited in this embodiment of this application.

Optionally, when the terminal device performs beam sweeping based on the configuration information #1 in step 401 and the SCell activation command and sends the second CSI report to the network device, and when the second CSI report includes the receive beam direction information, if the CSI reporting resource is a periodic resource, an information bit length of the second CSI report may be kept unchanged. In some possible implementations, valid reporting information in the second CSI report includes only the information field of the beam sweeping result and the information field of the valid indication, and other information is a padding bit used to keep the length of the CSI report unchanged. In this way, when receiving and demodulating the second CSI report, the network device does not need to change the length of the decoded CSI report based on different information reported in the CSI report. Therefore, implementation of a base station is simplified.

In addition, when the CSI reporting resource is not a periodic resource, that is, the CSI report is a semi-persistent report or an aperiodic report, the information bit length of the source CSI report may not be kept unchanged. This is not limited in this embodiment of this application.

405: The network device sends configuration information #2 to the terminal device.

In some optional embodiments, when the CSI-RS resource for activating the SCell of the terminal device is not configured in the configuration information #1, the network device may send the configuration information #2 to the terminal device based on the indication information #3. The configuration information #2 is used to configure a CSI-RS resource for activating the SCell of the terminal device, and the CSI-RS resource has a proper transmit beam direction, so that the terminal device can receive a CSI-RS and measure CSI information. In this case, both step 401 and step 405 are performed.

In some optional embodiments, when the CSI-RS resource for activating the SCell of the terminal device is configured in the configuration information #1, if determining, based on the indication information #3, that a receive beam direction of the CSI-RS resource configured in the configuration information #1 is improper, the network device may send the configuration information #2 to the terminal device based on the indication information #3. The configuration information #2 is used to configure a CSI-RS resource for activating the SCell of the terminal device, and the CSI-RS resource has a proper transmit beam direction, so that the terminal device can receive a CSI-RS and measure CSI information. The configuration information #2 may also be referred to as reconfiguration information. However, this is not limited in this embodiment of this application. In this case, both step 401 and step 405 are performed.

In some optional embodiments, when the CSI-RS resource for activating the SCell of the terminal device is configured in the configuration information #1, if the network device determines, based on the indication information #3, that a transmit beam direction of the CSI-RS resource configured in the configuration information #1 is proper, and the terminal device can receive a CSI-RS and measure CSI information, the network device may not perform step 405.

406: The terminal device performs CSI measurement based on the CSI-RS resource configured in step 401 or step 405, to obtain a CSI report, that is, the first CSI report.

In this step, a manner in which the terminal device performs CSI measurement and obtains the CSI report may be a related method/technology in a current technology. Details are not described in this application.

407: The terminal device sends the first CSI report to the network device.

In an example, when the first CSI report is a valid CSI report, an SCell activation process is completed.

In some possible implementations, the CSI report in step 401 to step 407 (including at least one of the first CSI report and the second CSI report) is reported within an SCell activation delay, and the activation delay includes time for performing beam sweeping by the terminal device. In an example, the time for performing beam sweeping in the SCell activation process may be added to the upper limit of the activation delay shown in FIG. 3, to obtain an upper limit k_uplimit of the activation delay. Details are as follows.

$$k\_uplimit = T_{HARQ} + T_{activation\_time} + T_{beam\_sweeping} + T_{CSI\_Reporting} \quad (4)$$

$T_{beam\_sweeping}$ indicates the time for performing beam sweeping in the SCell activation process, and is related to a measurement periodicity $T_{SMTC\_SCell}$ of an SSB or a CSI-RS resource periodicity.

Therefore, in this embodiment of this application, in the SCell activation process, the terminal device reports the receive beam direction information to the network device, so that the network device may adjust the transmit beam direction of the CSI-RS resource based on the receive direction information. In this way, the transmit beam direction of the CSI-RS may be aligned with a receive beam direction of the terminal device, and the terminal device may receive the CSI-RS resource and perform CSI measurement to obtain valid CSI information. Therefore, the SCell activation process is completed. In this embodiment of this application, because the CSI-RS resource can be configured based on the receive beam direction information, a problem of an SCell activation failure caused by misalignment of transmit and receive beams of a high frequency CSI-RS signal can be resolved.

It may be understood that, to implement the functions in the foregoing embodiments, the network device and the terminal device include corresponding hardware structures and/or software modules for performing the functions. A person skilled in the art should easily be aware that, in combination with the units and the method steps in the examples described in the embodiments disclosed in this application, this application can be implemented by hardware or a combination of hardware and computer software. Whether a function is performed by hardware or hardware driven by computer software depends on particular application scenarios and design constraints of the technical solutions.

Figure 8:
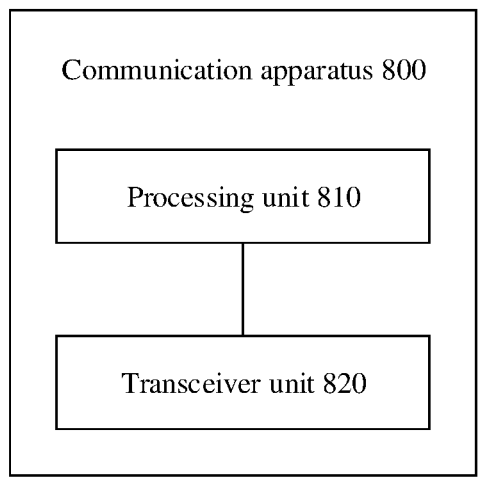
FIG. 8 is a schematic diagram of a communication apparatus according to an embodiment of this application.
Figure 9:
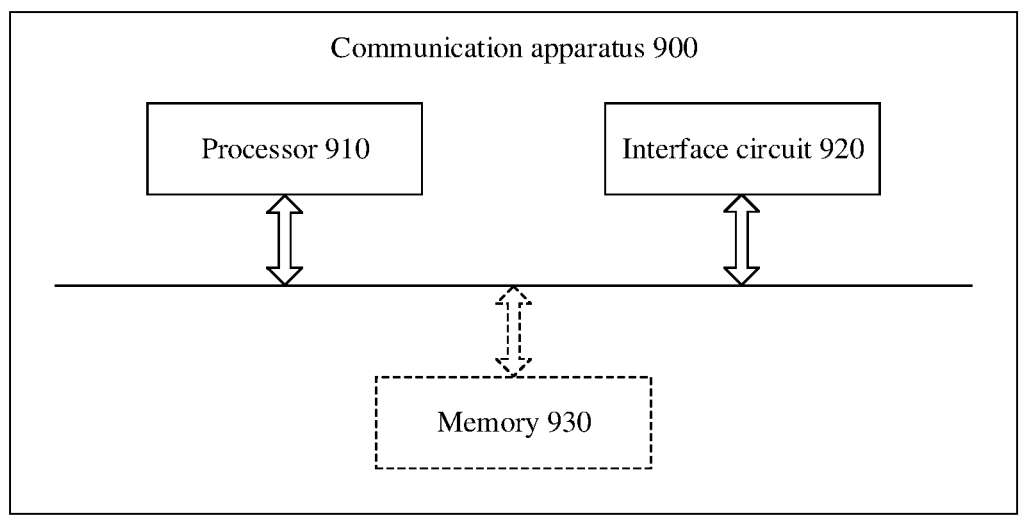
FIG. 9 is a schematic diagram of another communication apparatus according to an embodiment of this application.

FIG. 8 and FIG. 9 are schematic diagrams of structures of possible communication apparatuses according to embodiments of this application. These communication apparatuses may be configured to implement functions of the terminal device or the network device in the foregoing method embodiment. Therefore, beneficial effects of the foregoing method embodiment can also be implemented. In the embodiments of this application, the communication apparatus may be the terminal device 120 shown in FIG. 1, or may be the network device 110 shown in FIG. 1. Alternatively, the communication apparatus may be the terminal device 230 shown in FIG. 2, or may be the network device 210 or the network device 220 shown in FIG. 2. The communication apparatus may alternatively be a module (for example, a chip) used in the terminal device or the network device.

As shown in FIG. 8, a communication apparatus 800 includes a processing unit 810 and a transceiver unit 820. The communication apparatus 800 is configured to implement functions of the terminal device or the network device in the method embodiment shown in FIG. 4.

In a case in which the communication apparatus 1300 is configured to implement functions of the terminal device in the method embodiment shown in FIG. 1 or FIG. 2, the transceiver unit 820 is configured to send first indication information to a network device, where the first indication information is used to indicate receive beam direction information of the terminal device, and the receive beam direction information is used to determine a channel state information reference signal CSI-RS resource for activating a secondary cell of the terminal device. The transceiver unit 820 is further configured to receive configuration information sent by the network device, where the configuration information is used to configure the CSI-RS resource. The transceiver unit 820 is further configured to send a first CSI report to the network device, where the first CSI report is obtained based on the CSI-RS resource, and the first CSI report is used to activate the secondary cell.

The processing unit 810 is configured to determine the first indication information, and obtain the first CSI report.

In a case in which the communication apparatus 800 is configured to implement functions of the network device in the method embodiment shown in FIG. 4, the transceiver unit 820 is configured to receive first indication information sent by a terminal device, where the first indication information is used to indicate receive beam direction information of the terminal device, and the receive beam direction information is used to determine a channel state information reference signal CSI-RS resource for activating a secondary cell of the terminal device. The transceiver unit 820 is further configured to send configuration information to the terminal device, where the configuration information is used to configure the CSI-RS resource. The transceiver unit 820 is further configured to receive a first CSI report sent by the terminal device, where the first CSI report is obtained based on the CSI-RS resource, and the first CSI report is used to activate the secondary cell.

The processing unit 1310 is configured to determine the configuration information.

For more detailed descriptions of the processing unit 810 and the transceiver unit 820, directly refer to related descriptions in the method embodiment shown in FIG. 4. Details are not described herein again.

As shown in FIG. 9, a communication apparatus 900 includes a processor 910 and an interface circuit 920. The processor 910 and the interface circuit 920 are coupled to each other. It may be understood that the interface circuit 920 may be a transceiver or an input/output interface. Optionally, the communication apparatus 900 may further include a memory 930, configured to store instructions executed by the processor 910, input data required by the processor 910 to run the instructions, or data generated after the processor 910 runs the instructions.

When the communication apparatus 900 is configured to implement the method shown in FIG. 4, the processor 910 is configured to perform the function of the processing unit 910, and the interface circuit 920 is configured to perform the function of the transceiver unit 920.

When the communication apparatus is a chip used in a terminal device, the chip used in the terminal device implements functions of the terminal device in the foregoing method embodiment. The chip used in the terminal device receives information from another module (for example, a radio frequency module or an antenna) in the terminal device, where the information is sent by a network device to the terminal device. Alternatively, the chip used in the terminal device sends information to another module (for example, a radio frequency module or an antenna) in the terminal device, where the information is sent by the terminal device to a network device.

When the communication apparatus is a chip used in a network device, the chip used in the network device implements functions of the network device in the foregoing method embodiment. The chip used in the network device receives information from another module (for example, a radio frequency module or an antenna) in the network device, where the information is sent by a terminal device to the network device. Alternatively, the chip used in the network device sends information to another module (for example, a radio frequency module or an antenna) in the network device, where the information is sent by the network device to a terminal device.

It may be understood that, the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any conventional processor.

The method steps in the embodiments of this application may be implemented in a hardware manner, or may be implemented in a manner of executing software instructions by a processor. The software instructions may include corresponding software modules. The software modules may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, the storage medium is coupled to a processor, so that the processor can read information from the storage medium or write information into the storage medium. Certainly, the storage medium may also be a component of the processor. The processor and the storage medium may be located in an ASIC. In addition, the ASIC may be located in a network device or a terminal device. Certainly, the processor and the storage medium may exist in a network device or a terminal device as discrete components.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer programs or instructions. When the computer programs or instructions are loaded and executed on a computer, all or some of procedures or functions in the embodiments of this application are performed. The computer may be a general-purpose computer, a dedicated computer, a computer network, or another programmable apparatus. The computer programs or instructions may be stored in a computer-readable storage medium, or may be transmitted via the computer-readable storage medium. The computer-readable storage medium may be any usable medium accessible by a computer, or a data storage device, such as a server, integrating one or more usable media. The usable medium may be a magnetic medium, for example, a floppy disk, a hard disk, or a magnetic tape, or may be an optical medium, for example, a DVD, or may be a semiconductor medium, for example, a solid-state drive (SSD).

In the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. In the text descriptions of this application, the character "/" usually indicates an "or" relationship between associated objects.

It may be understood that numerical symbols in the embodiments of this application are differentiated merely for ease of description, but are not used to limit the scope of the embodiments of this application. Sequence numbers of the foregoing processes do not mean execution sequences. The execution sequences of the processes should be determined based on functions and internal logic of the processes.

What is claimed is:

1. A secondary cell activation method, comprising:
   receiving, by a terminal device, second indication information from a network device, wherein the second indication information indicates a report quantity of a second channel state information (CSI) report;
   sending, by the terminal device, first indication information to the network device, wherein the sending the first indication information comprises sending the second CSI report to the network device based on the second indication information, and wherein the first indication information indicates receive beam direction information of the terminal device and the second CSI report comprises the receive beam direction information, wherein the receive beam direction information is associated with a channel state information reference signal (CSI-RS) resource for activating a secondary cell of the terminal device, wherein the first indication information comprises a valid indication, wherein the valid indication indicating that the receive beam direction information is valid causes the network device to configure the CSI-RS resource based on the receive beam direction information, wherein the valid indication indicating that the receive beam direction information is invalid indicates that the receive beam direction information is one of an intermediate beam sweeping result or an invalid measurement result, and wherein the valid indication indicating that the receive beam direction information is invalid causes the network device to ignore the receive beam direction information;
   receiving, by the terminal device, configuration information from the network device, wherein the configuration information configures the CSI-RS resource;
   sending, by the terminal device, an invalid CSI report to the network device, wherein the invalid CSI report being invalid indicates that secondary cell activation has started; and
   sending, by the terminal device, a first CSI report to the network device, wherein the first CSI report is obtained based on the CSI-RS resource, and wherein the first CSI report is used to activate the secondary cell, and wherein the first CSI report is a valid CSI report indicating that the secondary cell activation is completed.

2. The method according to claim 1, wherein the receive beam direction information comprises at least one of a synchronization signal block (SSB) resource indication or a CSI-RS resource indication.

3. The method according to claim 1, wherein the second indication information comprises an information element indicating to the terminal device to report the receive beam direction information.

4. The method according to claim 1, further comprising:
   receiving, by the terminal device, a secondary cell activation command from the network device;
   wherein the sending, by the terminal device, the second CSI report to the network device based on the second indication information comprises:
   sending, by the terminal device, the second CSI report to the network device based on the second indication information and the secondary cell activation command.

5. The method according to claim 1, wherein the CSI report is reported within an activation delay of the secondary cell, and wherein the activation delay comprises a time for performing beam sweeping by the terminal device.

6. The method according to claim 1, wherein the receive beam direction information is determined according to a beam sweeping result obtained from beam sweeping by the terminal device.

7. A network device, comprising:
   at least one processor; and
   at least one non-transitory memory storing instructions for execution by the at least one processor, the instructions including instructions for:
   sending second indication information from the network device, wherein the second indication information indicates a report quantity of a second channel state information (CSI) report;
   receiving first indication information from a terminal device, wherein the receiving the first indication information comprises receiving the second CSI report from the network device based on the second indication information, and wherein the first indication information indicates receive beam direction information of the terminal device, and the receive beam direction information is associated with a channel state information reference signal (CSI-RS) resource for activating a secondary cell of the terminal device, wherein the first indication information comprises a valid indication;
   configuring the CSI-RS resource based on the receive beam direction information in response to the valid indication indicating that the receive beam direction information is valid;
   ignoring the receive beam direction information in response to the valid indication indicating that the receive beam direction information is invalid, wherein the valid indication indicating that the receive beam direction information is invalid indicates that the receive beam direction information is one of an intermediate beam sweeping result or an invalid measurement result;
   sending configuration information to the terminal device, wherein the configuration information configures the CSI-RS resource;
   receiving from the terminal device, an invalid CSI report, wherein the invalid CSI report being invalid indicates that secondary cell activation has started; and receiving a first CSI report from the terminal device, wherein the first CSI report is obtained based on the CSI-RS resource, wherein the first CSI report is used to activate the secondary cell, and wherein the first CSI report is a valid CSI report indicating that the secondary cell activation is completed.

8. The device according to claim 7, wherein the receive beam direction information comprises at least one of a synchronization signal block (SSB) resource indication or a CSI-RS resource indication.

9. The device according to claim 7,
wherein the second indication information comprises an information element indicating the terminal device to report the receive beam direction information.

10. The device according to claim 7, wherein the instructions further include instructions for:
sending a secondary cell activation command to the terminal device.

11. The device according to claim 7, wherein the CSI report is reported within an activation delay of the secondary cell, and wherein the activation delay comprises a time for performing beam sweeping by the terminal device.

12. A terminal device, comprising:
at least one processor; and
at least one non-transitory memory storing instructions for execution by the at least one processor, the instructions including instructions for:
receiving second indication information from a network device, wherein the second indication information indicates a report quantity of a second channel state information (CSI) report;
sending first indication information to the network device, wherein the sending the first indication information comprises sending the second CSI report to the network device based on the second indication information, and wherein the first indication information indicates receive beam direction information of the terminal device and the second CSI report comprises the receive beam direction information, and wherein the receive beam direction information is associated with a channel state information reference signal, CSI-RS resource for activating a secondary cell of the terminal device, wherein the first indication information comprises a valid indication, wherein the valid indication indicating that the receive beam direction information is valid causes the network device to configure the CSI-RS resource based on the receive beam direction information, wherein the valid indication indicating that the receive beam direction information is invalid indicates that the receive beam direction information is one of an intermediate beam sweeping result or an invalid measurement result, and wherein the valid indication indicating that the receive beam direction information is invalid causes the network device to ignore the receive beam direction information;
receiving configuration information from the network device, wherein the configuration information configures the CSI-RS resource;
sending an invalid CSI report to the network device, wherein the invalid CSI report being invalid indicates that secondary cell activation has started; and
sending a first CSI report to the network device, wherein the first CSI report is obtained based on the CSI-RS resource, wherein the first CSI report is used to activate the secondary cell, and wherein the first CSI report is a valid CSI report indicating that the secondary cell activation is completed.

13. The device according to claim 12, wherein the receive beam direction information comprises at least one of a synchronization signal block (SSB) resource indication or a CSI-RS resource indication.

14. The device according to claim 12, wherein the second indication information comprises an information element indicating the terminal device to report the receive beam direction information.

15. The device according to claim 12, wherein the instructions further include instructions for:
receiving a secondary cell activation command from the network device; and
wherein the instructions for sending the second CSI report to the network device based on the second indication information include instructions for:
sending the second CSI report to the network device based on the second indication information and the secondary cell activation command.

16. The device according to claim 12, wherein the CSI report is reported within an activation delay of the secondary cell, and wherein the activation delay comprises time for performing beam sweeping by the terminal device.

17. The device according to claim 12, wherein the receive beam direction information is determined according to a beam sweeping result obtained from beam sweeping by the terminal device.

* * * * *